2,854,483
BRONCHODILATOR COMPOUNDS

Andre L. Langis and Gordon S. Myers, Ville St. Laurent, Quebec, and Gordon A. Grant, Mount Royal, Quebec, Canada, assignors to American Home Products Corporation, New York, N. Y., a corporation of Delaware No Drawing. Application October 6, 1954
Serial No. 460,774

2 Claims. (Cl. 260—570.6)

This invention relates to new chemical compounds having high bronchodilator activity, and low pressor and toxic properties. It is also concerned with the process by which they may be prepared.

The new compounds may be administered orally, and are potentially valuable medicinals for the treatment of patients suffering from asthma, bronchitis and other pulmonary conditions.

Our new chemical compounds may be represented by the following structural formula:

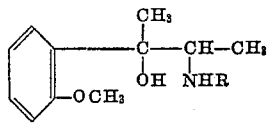

where R is a lower alkyl radical or benzyl. Among compounds of this general class those in which R is a radical such as methyl, ethyl, propyl, isopropyl and benzyl are characterized by high bronchodilator activity and low acute toxicity.

Our new chemical compounds may be readily prepared by reacting an α-amino derivative of o-methoxypropiophenone with a methyl magnesium halide Grignard reagent, the reaction being preferably carried out in ethereal solution. The resulting Grignard complex is then hydrolyzed with a dilute acid in the usual manner, thereby forming the desired new compounds. The α-amino derivative of o-methoxypropiophenone may be prepared by reaction of o-methoxy-α-bromopropiophenone and an alkyl or aralkyl amine.

More specifically, a compound of the formula:

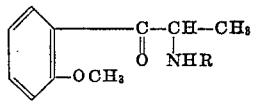

where R is a lower alkyl radical or benzyl, may be reacted with a methyl Grignard reagent, preferably in an ether solution. By hydrolysis with a dilute acid such as hydrogen chloride, as customary in reactions of the Grignard type, the Grignard complex which is first formed is converted to the new chemical compounds whose type formula has been given above. They may then be recovered from the solution, either as the free base, or as acid addition salts of the free base, such as the hydrohalide salts.

When tested for bronchodilator activity by the De Beer tracheal ring test, the new compounds were found to possess high bronchodilator activity. In relatively low concentrations they are capable of producing complete relaxation of histamine-induced contractions of the guinea pig tracheal chain. Acute toxicity, as determined by intraperitoneal injection in mice, is relatively low.

The following examples are illustrative of our invention.

EXAMPLE 1

3-benzylamino-2-(o-methoxyphenyl)-2-butanol

The compound o-methoxy-α-benzylaminopropiophenone was first prepared from benzylamine and o-methoxy-α-bromopropiophenone. The latter, in the amount of 67 grams, was dissolved in 200 milliliters of chloroform, and the resulting solution then added dropwise to a solution of 88 grams of benzylamine in 100 milliliters of water. The resulting mixture was stirred at a temperature of 35–40° C. for 90 minutes. This resulted in o-methoxy-α-benzylaminopropiophenone. After washing with water to free it of excess benzylamine, there was thus recovered 58 grams of the product.

A part of the resulting product was dissolved in 50 milliliters of dry ether, and then poured into cold ethereal hydrogen chloride, thereby yielding the crystalline product o-methoxy-α-benzylaminopropiophenone hydrochloride. After recrystallization from a mixture of methanol and ether, one sample of the crystalline hydrochloride was found to melt at 182–185° C.

7.1 grams of o-methoxy-α-benzylaminopropiophenone as obtained above was then treated with an ethereal solution of a methyl Grignard reagent. The Grignard reagent was prepared by adding a solution containing 90 grams of methyl iodide dissolved in 100 milliliters of dry ether to a mixture of metallic magnesium (15 grams) and iodine crystals in 100 milliliters of dry ether. The o-methoxy-α-benzylaminopropiophenone was then added, dropwise, to the ether solution. The mixture was heated to reflux for one hour, and the resulting Grignard complex hydrolyzed by pouring the reaction mixture into cold dilute hydrochloric acid. After the solution had been made alkaline by the addition of ammonia, the product was extracted from the aqueous reaction mixture with ether. There was thus obtained 8 grams of the base, 3-benzylamino-2-(o-methoxyphenyl)-2-butanol.

This base was then dissolved in 15 milliliters of dry ether, and the solution poured into cold ethereal hydrogen chloride. There was thereby secured 6 grams of the crystalline product, 3-benzylamino-2-(o-methoxyphenyl)-2-butanol hydrochloride. After recrystallization from a mixture of methanol and ether, one sample of this product melted at 215–217° C. Analysis for carbon, hydrogen, nitrogen and chlorine confirmed the empiric formula $C_{18}H_{23}O_2N \cdot HCl$.

Tests of the compound for bronchodilator activity in accordance with the De Beer tracheal ring test indicated that concentrations of 100 micrograms of the compound per milliliter produced complete relaxation of histamine-induced contraction of the guinea pig tracheal chain. Contractions of the guinea pig tracheal chain that had been induced by barium chloride and by acetyl choline, respectively, were completely relieved by concentrations of the new chemical compound of 100 micrograms per milliliter, and 125 micrograms per milliliter, in each case.

For comparison purposes, ephedrine and orthoxine hydrochloride [β-(o-methoxyphenyl)-isopropyl methylamine hydrochloride] were also tested under similar conditions following the procedure of the De Beer tracheal ring test for bronchodilator activity. At a concentration of 100 micrograms per milliliter, ephedrine caused only 50 percent relaxation of a histamine-induced contraction of the guina pig tracheal chain. Even at levels up to 800 micrograms per milliliter, ephedrine was ineffective when used for relieving tracheal chain contractions induced by acetyl choline or by barium chloride. Orthoxine hydrochloride was also ineffective when used in concentrations of 100 micrograms per milliliter, whether the contractions had been induced in the tracheal chain by histamine, or by acetyl choline.

When tested by intraperitoneal injection into the mouse, the new compound was found to have relatively low acute toxicity. For example, an aqueous solution containing 120 milligrams of the compound per kilogram were required to produce 50 percent mortality over a twenty-four hour period in a large group of mice, as determined by intraperitoneal injection.

EXAMPLE 2

*3-isopropylamino-2-(o-methoxyphenyl)-2-butanol*

Methyl magnesium iodide Grignard reagent was prepared by adding a solution of 90 grams of methyl iodide in 100 milliliters of dry ether to 15 grams of metallic magnesium and some iodine crystals in 100 milliliters of dry ether. After reaction was complete, an ethereal solution containing 8.6 grams of o-methoxy-α-isopropylaminopropiophenone was added dropwise to the Grignard reagent.

The o-methoxy-α-isopropylaminopropiophenone may be prepared from o-methoxy-α-bromopropiophenone and isopropylamine, following the procedure given in Example 1.

The mixture of methyl Grignard reagent and o-methoxy-α-isopropylaminopropiophenone was then heated to reflux for one hour, and the resulting Grignard complex hydrolyzed by pouring into a mixture of ice and dilute hydrochloric acid. The reaction mixture was made alkaline by the addition of ammonia, and the new product then extracted with ether. There was thus obtained 9 grams of 3-isopropylamino-2-(o-methoxyphenyl)-2-butanol base.

A portion of this base was then dissolved in dry ether, and poured into cold ethereal hydrogen chloride, thereby resulting in crystalline 3-isopropylamino-2-(o-methoxyphenyl)-2-butanol hydrochloride. After recrystallization from a mixture of methanol and ether, one sample of the hydrochloride melted at 180–182° C. Analysis for carbon, hydrogen, nitrogen and chlorine confirmed the empiric formula $C_{14}H_{23}O_2N \cdot HCl$.

When the compound was tested by means of the De Beer tracheal ring test for bronchodilator activity, a concentration of 600 micrograms per milliliter produced complete relaxation of histamine-induced contraction of the guinea pig tracheal chain. The compound also possesses relatively low acute toxicity. When tested by intraperitoneal injection in the mouse it was found that an aqueous solution containing 90 milligrams of the new compound per kilogram were required to produce 50 percent mortality over a twenty-four hour period.

The above description and examples are intended to be illustrative only. Modifications thereof, as well as variations therefrom, are intended to be included within the scope of the appended claims.

We claim:

1. A compound selected from the group which consists of 3-benzylamino-2-(o-methoxyphenyl)-2-butanol and its hydrochloride salt.

2. 3-benzylamino-2-(o-methoxyphenyl)-2-butanol hydrochloride.

References Cited in the file of this patent

UNITED STATES PATENTS

| | | |
|---|---|---|
| 1,959,392 | Stolz et al. | May 22, 1934 |
| 1,978,539 | Klarer et al. | Oct. 30, 1934 |
| 2,585,988 | Asscher | Feb. 19, 1952 |
| 2,680,115 | Ruddy et al. | June 1, 1954 |

FOREIGN PATENTS

| | | |
|---|---|---|
| 657,302 | Great Britain | Sept. 19, 1951 |